(12) United States Patent
Bush, III et al.

(10) Patent No.: US 9,514,745 B2
(45) Date of Patent: *Dec. 6, 2016

(54) VOICE FOCUS ENABLED BY PREDETERMINED TRIGGERS

(71) Applicant: International Business Machines Corporation, Armonk, NY (US)

(72) Inventors: Hobert Bush, III, Raleigh, NC (US); James E. Fox, Apex, NC (US); Vishavpal S. Shergill, Canton, MI (US); Justin P. Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/636,822

(22) Filed: Mar. 3, 2015

(65) Prior Publication Data

US 2015/0348545 A1    Dec. 3, 2015

Related U.S. Application Data

(63) Continuation of application No. 14/288,114, filed on May 27, 2014.

(51) Int. Cl.
*G01L 15/00* (2006.01)
*G10L 17/00* (2013.01)
(Continued)

(52) U.S. Cl.
CPC ........... *G10L 15/20* (2013.01); *G10L 15/08* (2013.01); *G10L 17/00* (2013.01); *G10L 21/0208* (2013.01); *G10L 2021/02087* (2013.01)

(58) Field of Classification Search
USPC ................... 704/226, 233, 235, 246
See application file for complete search history.

(56) References Cited

U.S. PATENT DOCUMENTS

| | | | |
|---|---|---|---|
| 5,036,539 A * | 7/1991 | Wrench, Jr. ............... | G06F 3/16 704/246 |
| 7,343,023 B2 * | 3/2008 | Nordqvist ............ | H04R 25/505 381/317 |

(Continued)

FOREIGN PATENT DOCUMENTS

| | | |
|---|---|---|
| EP | 1303166 B1 | 12/2007 |
| WO | 9508248 A1 | 3/1995 |

(Continued)

OTHER PUBLICATIONS

Condliffe, J., "How We Identify Single Voices in a Crowd", [online], [Retrieved on May 23, 2014]. Retrieved from the Internet at <URL: http://gizmodo.com/5903064/how-we-identify-single-voices-in-acrowd>, Apr. 18, 2012, Total 10 pp.

(Continued)

*Primary Examiner* — Olujimi Adesanya
(74) *Attorney, Agent, or Firm* — Janaki K. Davda; Konrad, Raynes, Davda & Victor LLP

(57) ABSTRACT

Provided are techniques for voice focus enabled by predetermined triggers. Voice recognition is used to identify one or more pre-determined triggers from a voice of a speaker. In response to identifying the one or more pre-determined triggers, a voice recognition template is dynamically created for the voice of the speaker, and the voice recognition template and voice isolation are used to focus on the voice from the speaker.

7 Claims, 6 Drawing Sheets

(51) Int. Cl.
  *G10L 21/00* (2013.01)
  *G10L 21/02* (2013.01)
  *G10L 15/20* (2006.01)
  *G10L 15/26* (2006.01)
  *G10L 15/08* (2006.01)
  *G10L 21/0208* (2013.01)

(56) References Cited

U.S. PATENT DOCUMENTS

| | | | |
|---|---|---|---|
| 8,050,917 B2* | 11/2011 | Caspi | H04M 3/56 379/142.05 |
| 8,379,891 B2* | 2/2013 | Tashev | H04R 3/12 381/303 |
| 2002/0002465 A1* | 1/2002 | Maes | G10L 15/065 704/275 |
| 2005/0033572 A1* | 2/2005 | Jin | G10L 15/20 704/246 |
| 2005/0091060 A1 | 4/2005 | Wing | |
| 2006/0020457 A1* | 1/2006 | Tripp | G10L 17/00 704/246 |
| 2006/0075422 A1* | 4/2006 | Choi | G01S 3/7864 725/18 |
| 2006/0111904 A1* | 5/2006 | Wasserblat | G10L 17/00 704/246 |
| 2008/0175423 A1* | 7/2008 | Hamacher | G10L 21/0208 381/317 |
| 2008/0256613 A1* | 10/2008 | Grover | G06F 21/32 726/5 |
| 2009/0018826 A1* | 1/2009 | Berlin | G10L 15/07 704/223 |
| 2009/0043573 A1* | 2/2009 | Weinberg | G10L 17/06 704/223 |
| 2010/0086108 A1* | 4/2010 | Jaiswal | G10L 17/005 379/88.04 |
| 2010/0106501 A1* | 4/2010 | Miki | G10L 17/04 704/243 |
| 2010/0246837 A1* | 9/2010 | Krause | G10L 15/00 381/58 |
| 2010/0284310 A1* | 11/2010 | Shaffer | H04L 12/1822 370/260 |
| 2011/0237295 A1 | 9/2011 | Bartkowiak et al. | |
| 2011/0249839 A1 | 10/2011 | Mindlin et al. | |
| 2011/0261983 A1 | 10/2011 | Claussen et al. | |
| 2011/0320201 A1* | 12/2011 | Kaufman | G10L 17/04 704/251 |
| 2012/0191450 A1 | 7/2012 | Pinson | |
| 2013/0022189 A1* | 1/2013 | Ganong, III | G10L 15/00 379/202.01 |
| 2013/0022216 A1* | 1/2013 | Ganong, III | H04M 3/569 381/92 |
| 2013/0024196 A1* | 1/2013 | Ganong, III | G10L 17/00 704/246 |
| 2013/0144622 A1 | 6/2013 | Yamada et al. | |
| 2013/0144623 A1* | 6/2013 | Lord | G09B 21/006 704/249 |
| 2014/0072156 A1* | 3/2014 | Kwon | H04R 25/453 381/318 |

FOREIGN PATENT DOCUMENTS

| | | |
|---|---|---|
| WO | 2005107320 A1 | 11/2005 |
| WO | 2010003068 A1 | 1/2010 |

OTHER PUBLICATIONS

English Abstract for EP1303166B1, published on Dec. 19, 2007, Total 1 p.

List of IBM Patents or Patent Applications Treated as Related, Total 2 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Neuro AI, "Speech Recognition", [online], [Retrieved on Apr. 11, 2014]. Retrieved from the Internet at <URL: http://www.learnartificialneuralnetworks.com/speechrecognition.html>, Total 8 pp.

Potts, L.G., M.W. Skinner, R.A. Litovsky, M.J. Strube, and F. Kuk, "Recognition and Localization of Speech by Adult Cochlear Implant Recipients Wearing a Digital Hearing Aid in the Nonimplanted Ear (Bimodal Hearing)", Published in final edited form as: J Am Acad Audiol. Jun. 2009; 20(6): 353-373. [Also, Total 38 pp.].

Preliminary Amendment, Mar. 3, 2015, for U.S. Appl. No. 14/288,114, filed May 27, 2014 by H. Bush et al., Total 5 pp. [57.328 (PrelimAmend)].

UBM Tech, "Researchers Prove they can Isolate Voices in a Crowd", [online], [Retrieved on Apr. 11, 2014]. Retrieved from the Internet at <URL: http://www.techweb.com/news/192300043/researchers-prove-they-can-is>, Aug. 24, 2006, Total 2 pp.

U.S. Appl. No. 14/288,114, filed May 27, 2014, entitled "Voice Focus Enabled by Predetermined Triggers", invented by H. Bush et al., Total 25 pp. [57.328 (Appln)].

Wikipedia, "Cocktail Party Effect", [online], [Retrieved on May 23, 2014]. Retrieved from the Internet at <URL: http://en.wikipedia.org/wiki/Cocktail_party_effect>, Total 4 pp.

Wikipedia, "Speaker Recognition", [online], [Retrieved on Apr. 11, 2014]. Retrieved from the Internet at <URL: http://en.wikipedia.org/wiki/Speaker_recognition>, Total 5 pp.

Wikipedia, "Speech Recognition", [online], [Retrieved on Apr. 11, 2014]. Retrieved from the Internet at <URL: http://en.wikipedia.org/wiki/Speech_recognition>, Total 14 pp.

Office Action 1, Jul. 2, 2015, for U.S. Appl. No. 14/288,114, filed May 27, 2014 by H. Bush et al., Total 25 pp. [57.328 (OA1)].

Response to Office Action 1, Oct. 2, 2015, for U.S. Appl. No. 14/288,114, filed May 27, 2014 by H. Bush et al., Total 15 pp. [57.328 (ROA1)].

Final Office Action, Dec. 30, 2015, for U.S. Appl. No. 14/288,114, filed May 27, 2014 by H. Bush et al., Total 23 pp. [57.328 (FOA)].

Response to Final Office Action, Mar. 21, 2016, for U.S. Appl. No. 14/288,114, filed May 27, 2014 by H. Bush et al., Total 9 pp. [57.328 (RFOA)].

Office Action 3, Apr. 5, 2016, for U.S. Appl. No. 14/288,114, filed May 27, 2014 by H. Bush et al., Total 27 pp. [57.328 (OA3)].

Response to Office Action 3, Jul. 5, 2016, for U.S. Appl. No. 14/288,114, filed May 27, 2014 by H. Bush et al., Total 10 pp. [57.328 (ROA3)].

Notice of Allowance, Aug. 5, 2016, for U.S. Appl. No. 14/288,114, filed on May 27, 2014 by H. Bush et al., Total 15 pp.

* cited by examiner

VOICE FOCUS ENABLED BY PREDETERMINED TRIGGERS

BACKGROUND

Embodiments of the invention relate to voice focus enabled by predetermined triggers. In certain embodiments, the voice recognition enabled by predetermined triggers is implemented in a hearing aid.

For those who wear hearing aids, it can be difficult to distinguish a conversation in a crowd or in a situation that has a high amount of background noise. This is known as the "cocktail party effect".

Having a discussion or conversation in a crowded room or in a situation in which there is ambient noise may result in the speaker having to shout, and the person wearing the hearing aid to cup their ear and "point" their ear towards the speaker to help isolate the conversation. Another solution is to increase the volume of the hearing aid, which may contribute to increased hearing loss. Moreover, yet another existing solution uses keywords to position microphones in hearing aids toward the speaker for better clarity.

SUMMARY

Provided is a method for voice focus enabled by predetermined triggers. The method comprises using, with a processor of a computer, voice recognition to identify one or more pre-determined triggers from a voice of a speaker; and, in response to identifying the one or more pre-determined triggers, dynamically creating a voice recognition template for the voice of the speaker, and using the voice recognition template and voice isolation to focus on the voice from the speaker.

Provided is a system for voice focus enabled by predetermined triggers. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: using voice recognition to identify one or more pre-determined triggers from a voice of a speaker; and, in response to identifying the one or more pre-determined triggers, dynamically creating a voice recognition template for the voice of the speaker, and using the voice recognition template and voice isolation to focus on the voice from the speaker.

Provided is a computer program product for voice focus enabled by predetermined triggers. The computer program product comprises a computer readable storage medium having program code embodied therewith, the program code executable by at least one processor to perform: using, by the at least one processor, voice recognition to identify one or more pre-determined triggers from a voice of a speaker; and, in response to identifying the one or more pre-determined triggers, dynamically creating, by the at least one processor, a voice recognition template for the voice of the speaker, and using, by the at least one processor, the voice recognition template and voice isolation to focus on the voice from the speaker.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
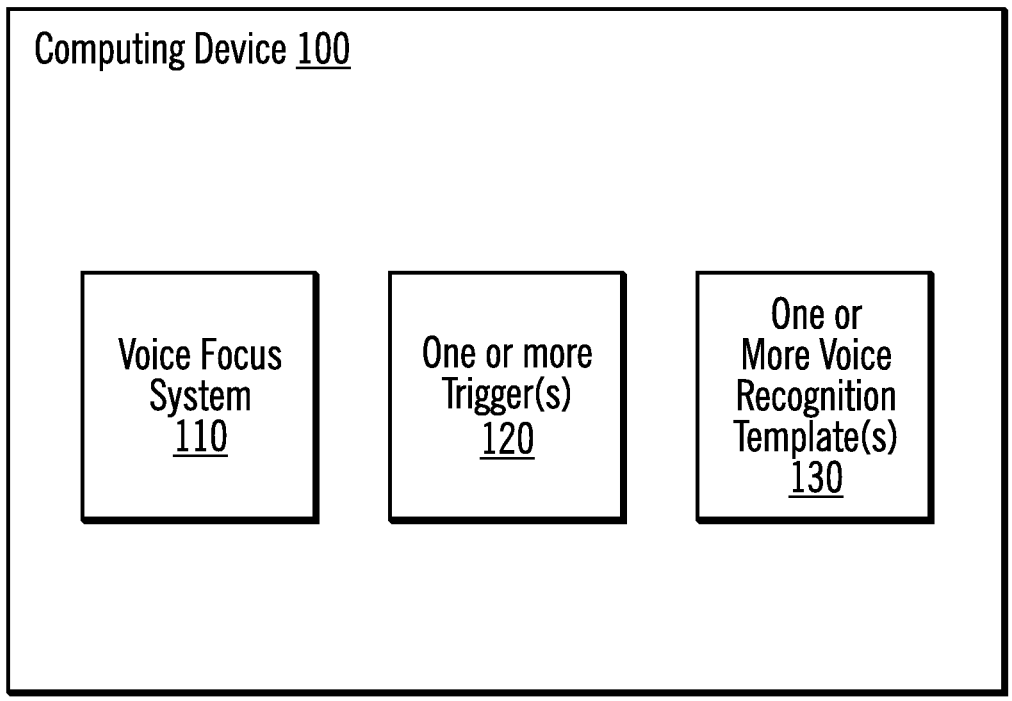
FIG. 1 illustrates a computing device in accordance with certain embodiments.

FIG. 1 illustrates a computing device 100 in accordance with certain embodiments. The computing device 100 includes a voice focus system 110, one or more triggers 120 (which may be referred to as pre-determined triggers), and one or more voice recognition templates 130. The computing device 100 may be any type of computing device, such as, a smartphone, a laptop computer, etc. In certain embodiments, the computing device 100 is a hearing aid or is incorporated into a hearing aid.

In various embodiments, "voice" may refer to speech or other audible sounds received from a human, an animal (e.g., a dog, a bird, a dolphin, etc.), a computer, etc.). In certain embodiments, a speaker is a human who can make audible sound (either by the human's own voice or by mechanical or computer means (e.g., if the user is unable to use a voice to speak). In certain embodiments, a speaker may be any animal or any computing system that can make an audible sound. Then, the one or more triggers 120 may be trigger keywords (e.g., "Hello") or other pre-defined, audible sounds (e.g., a bark of a particular dog owned by the listener). The voice focus system 110 listens for one or more triggers 120 that indicate that a listener (e.g., a person holding the smartphone or the wearer of a hearing aid) is being addressed by a speaker, then the voice focus system 110 isolates the voice of the speaker and cancels out background noise. The background noise may be from other speakers or may be other types of noise (e.g., ambient noise, music, construction noise, etc.). By isolating the voice of the speaker and cancelling out background noise, the voice focus system "focusses" on the speaker.

Figure 2:
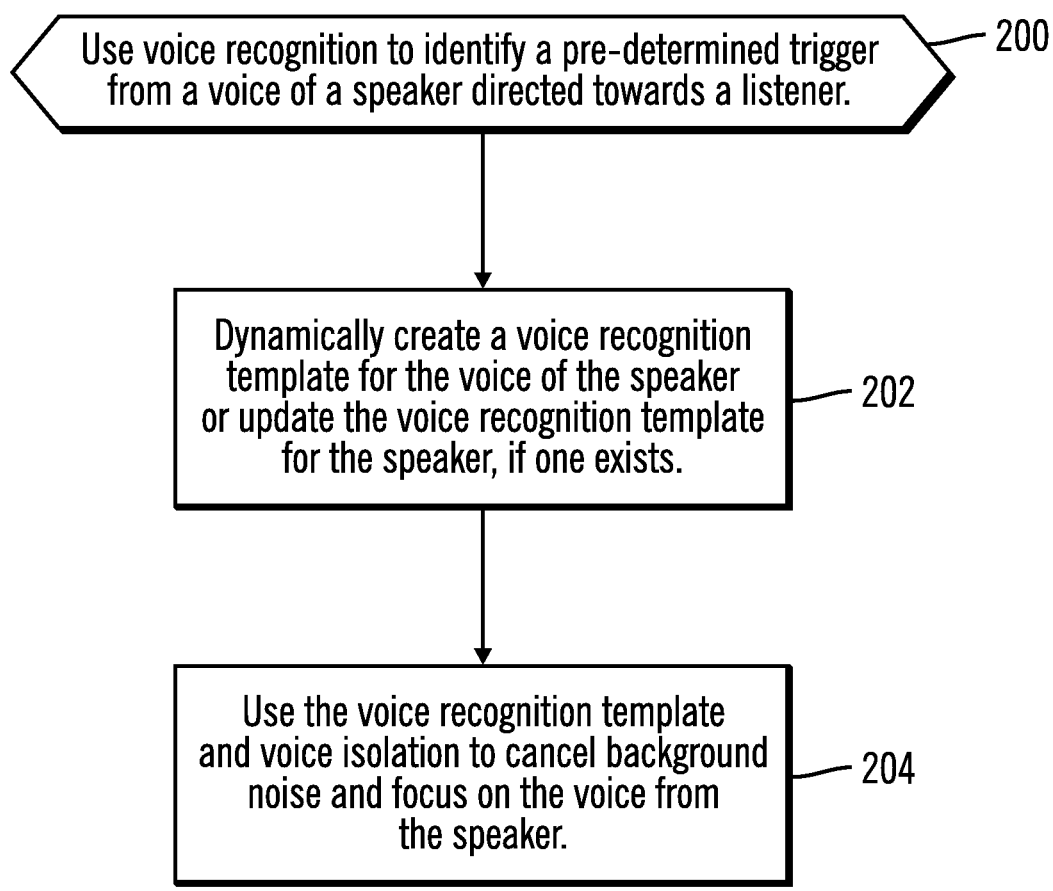
FIG. 2 illustrates, in a flow diagram, operations performed by the voice focus system for voice isolation in accordance with certain embodiments.

FIG. 2 illustrates, in a flow diagram, operations performed by the voice focus system 110 for voice isolation in accordance with certain embodiments. Control begins at block 200 with the voice focus system 110 using voice recognition (also referred to as "voice recognition technology") to identify one or more pre-determined triggers from a voice of a speaker directed towards a listener. In certain embodiments, the one or more pre-determined triggers include one or more words that address the listener. In certain embodiments, the triggers are associated with the listener in a listener's voice recognition template. The one or more triggers engage (i.e., initiate) voice isolation (also referred to as "voice isolation technology").

The voice recognition may be described as identifying the speaker by, for example, characteristics of their voices (voice biometrics) and identifying what words the speaker is saying. The voice biometrics may be part of the voice recognition template. Then, the voice focus system 110 determines whether the words are triggers.

In block 202, in response to the one or more trigger words being identified, the voice focus system 110 dynamically creates a voice recognition template for the voice of the speaker or updates the voice recognition template for the speaker, if one exists. In certain embodiments, the listener is provided with the option of whether to store a created voice recognition template. A voice recognition template may be described as a data set containing parameters for speaker recognition and settings for earpiece configuration. The parameters may include unique voice biometrics related to the speaker's voice.

In block 204, the voice focus system 110 uses the voice recognition template and voice isolation to cancel background noise and focus on the voice from the speaker. In certain embodiments, focusing on the voice includes isolating, from the background noise, words or other audible sounds from the speaker.

Thus, the voice focus system 110 uses a two part approach to focus on a voice of a particular speaker when there are multiple speakers or noise (e.g., music) in addition to the voice of the particular speaker. First, the voice focus system 110 uses voice recognition to listen for a predetermined trigger directed to a listener (e.g., "Excuse me John" or "Hey John"). Second, a voice is identified as trying to address the listener, the voice focus system 110 then identifies that speaker's voice recognition template and uses voice isolation to "tune in" the speaker who addressed the listener.

In certain embodiments, when multiple speakers address a listener simultaneously or nearly simultaneously (e.g., within seconds of each other), the voice focus system 110 dynamically creates voice recognition templates for each of the multiple speakers. In certain embodiments, the voice focus system 110 may select one of the multiple speakers to focus on using various factors. In certain embodiments, the factors are one or more keywords, clarity of the conversation, direction of the speaker, and existing, stored speaker voice recognition templates.

Figure 3:
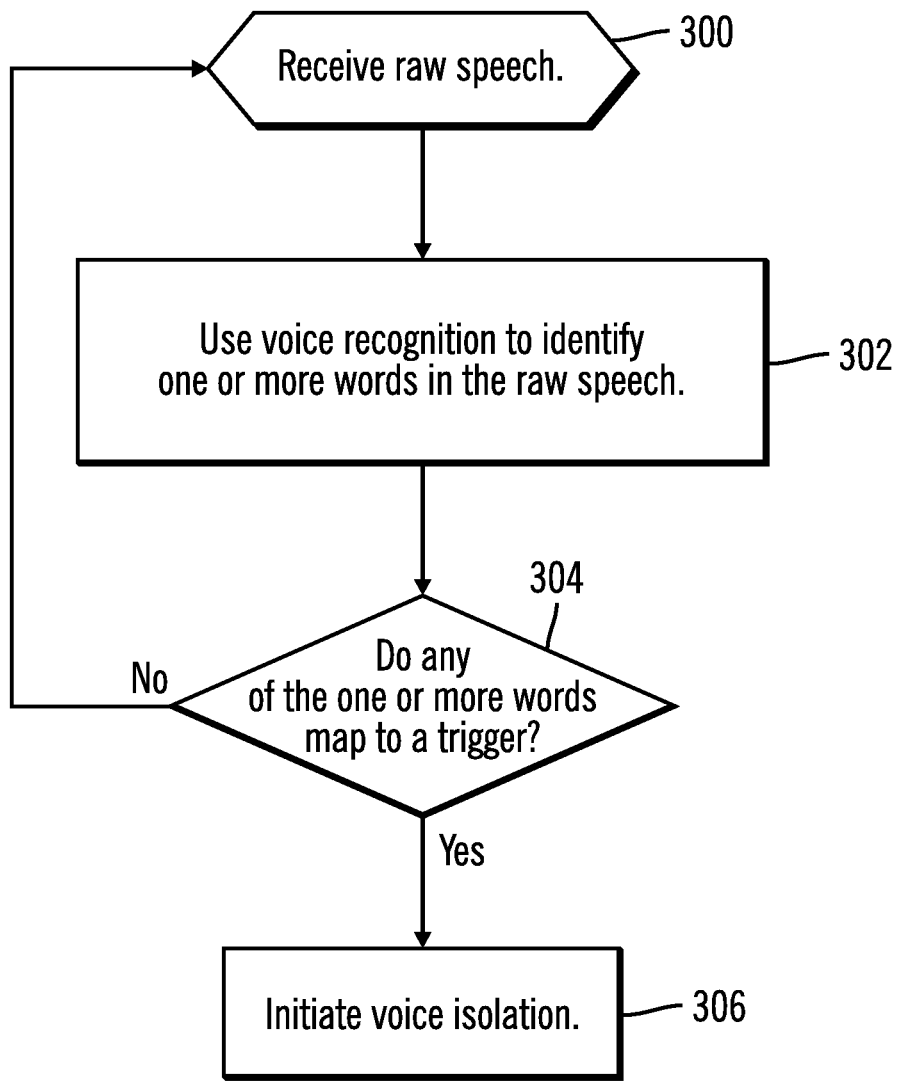
FIG. 3 illustrates, in a flow diagram, operations performed by the voice focus system for initiating voice isolation in accordance with certain embodiments.

FIG. 3 illustrates, in a flow diagram, operations performed by the voice focus system for initiating voice isolation in accordance with certain embodiments. Control begins at block 300 with the voice focus system 110 receiving raw speech. In block 302, the voice focus system 110 uses voice recognition to identify one or more words in the raw speech. In block 304, the voice focus system 110 determines whether any of the one or more words map to a trigger (e.g., a keyword or audible sound). If so, processing continues to block 306, otherwise, processing returns to block 300 to process additional raw speech. In bock 306, the voice focus system 110 initiates voice isolation.

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
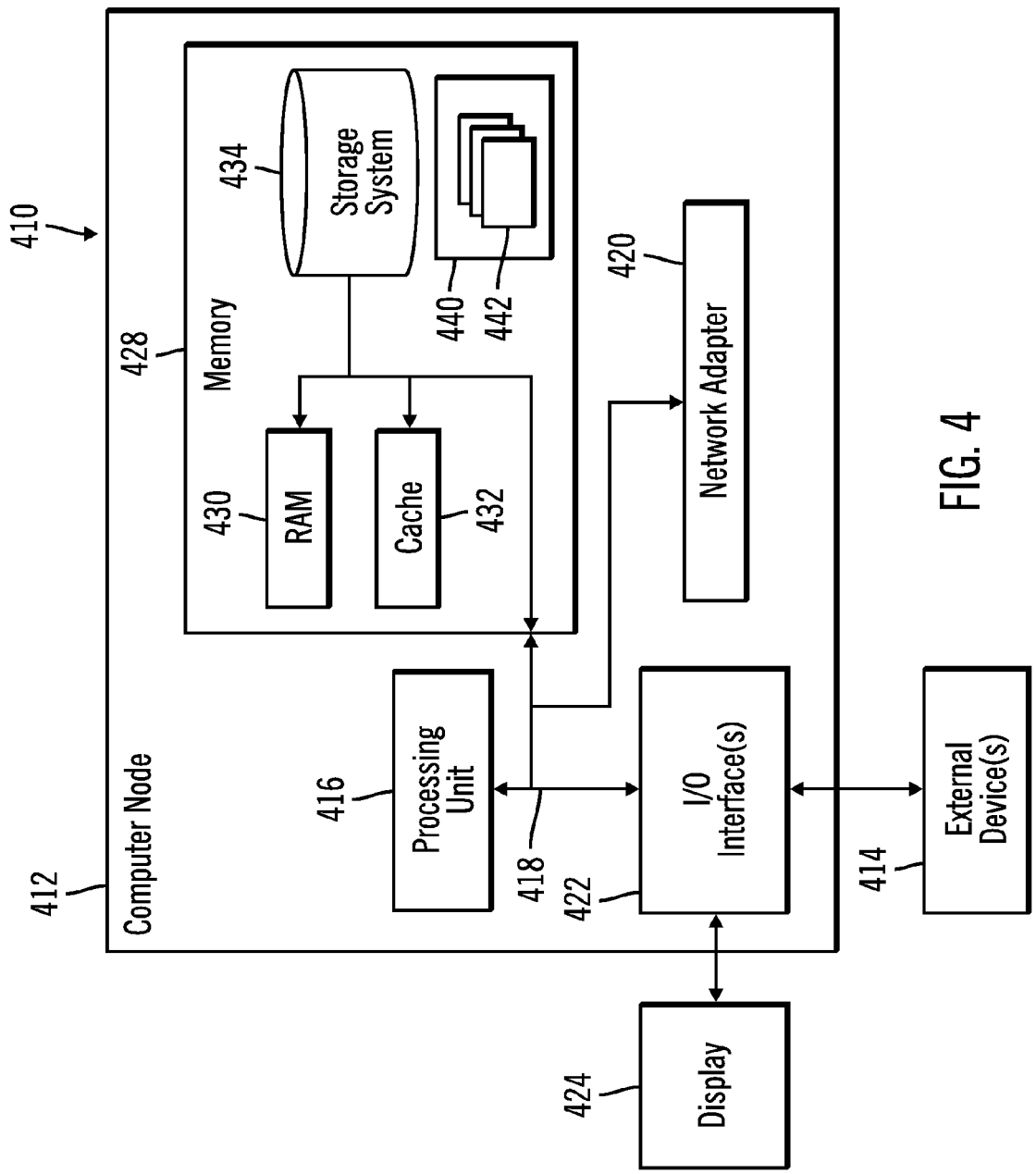
FIG. 4 depicts a cloud computing node in accordance with certain embodiments.

Referring now to FIG. 4, a schematic of an example of a cloud computing node is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
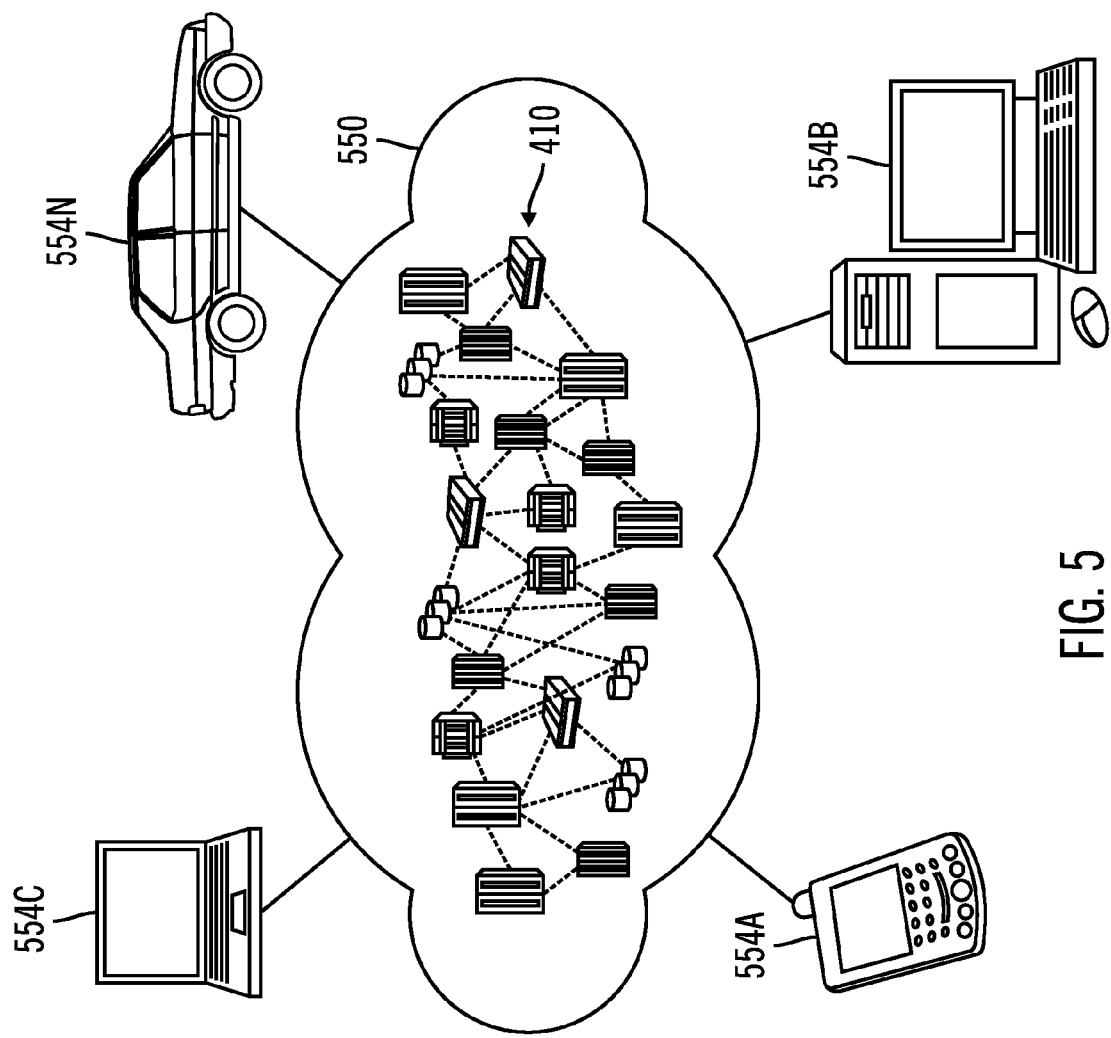
FIG. 5 depicts a cloud computing environment in accordance with certain embodiments.

Referring now to FIG. 5, illustrative cloud computing environment 550 is depicted. As shown, cloud computing environment 550 comprises one or more cloud computing nodes 410 with which local computing devices used by cloud consumers, such as, for example, personal digital assistant (PDA) or cellular telephone 554A, desktop computer 554B, laptop computer 554C, and/or automobile computer system 554N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 410 and cloud computing environment 550 can communicate with any type of computerized device over any type of network and/or network addressable connection (e.g., using a web browser).

Figure 6:
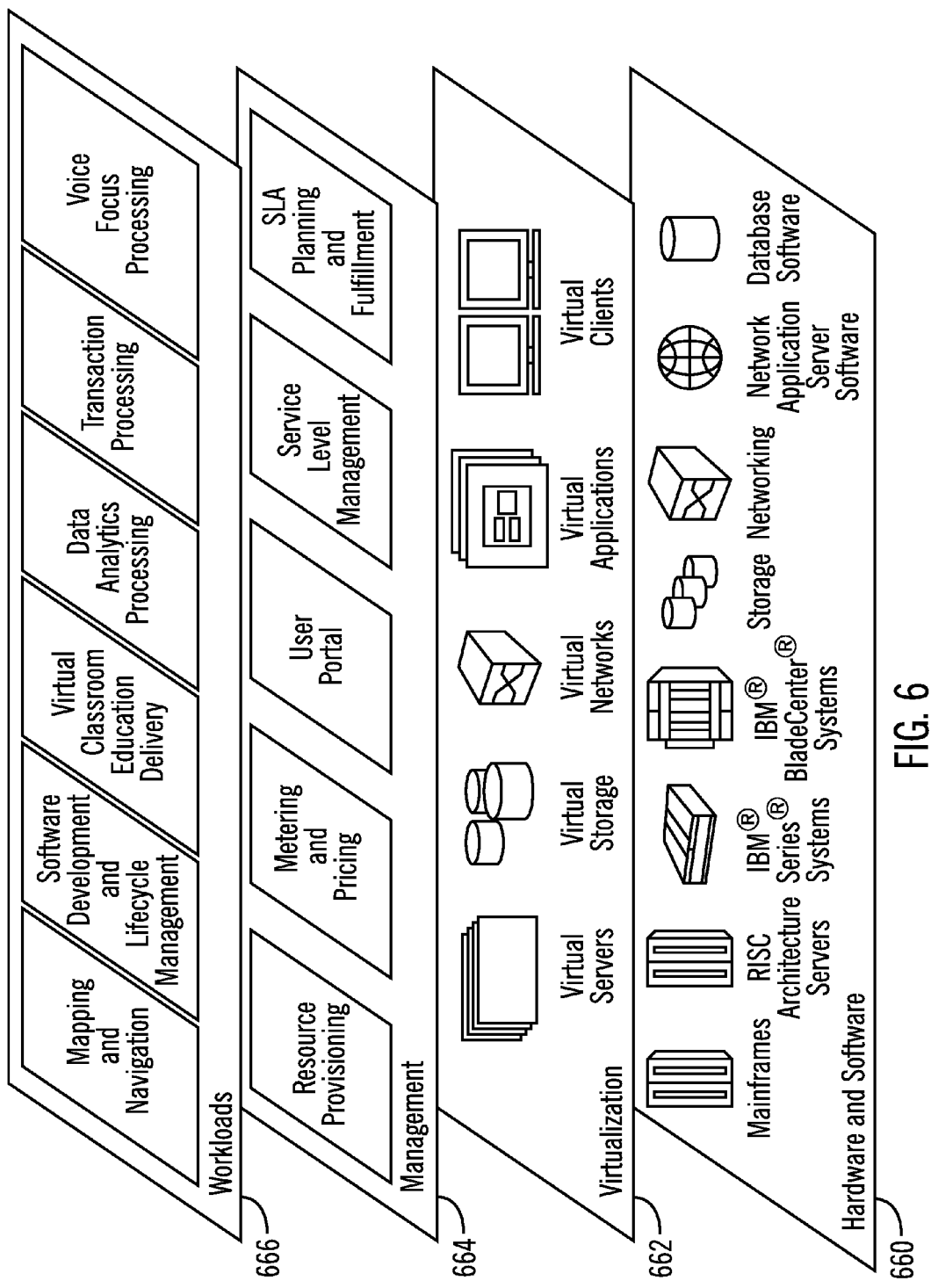
FIG. 6 depicts abstraction model layers in accordance with certain embodiments.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and voice focus processing.

Thus, in certain embodiments, software or a program, implementing voice focus processing in accordance with embodiments described herein, is provided as a service in a cloud environment.

In certain embodiments, the computing device 100 has the architecture of computing node 410. In certain embodiments, the computing device 100 is part of a cloud environment. In certain alternative embodiments, the computing device 100 is not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, comprising:
using, with a processor of a computer, voice recognition to identify one or more pre-determined triggers from each voice of multiple speakers addressing a listener nearly simultaneously; and
in response to identifying the one or more pre-determined triggers,
for each of the multiple speakers that does not have a previously stored voice recognition template, dynamically creating a voice recognition template to store voice biometrics of that speaker;
for each of the multiple speakers that does have a stored voice recognition template, updating the voice recognition template;
selecting a speaker from among the multiple speakers focus on based on clarity of that speaker, direction of that speaker, one or more keywords spoken by that speaker, and whether there is a previously stored voice recognition template for that speaker; and
using the voice recognition template and voice isolation to focus on the voice from the selected speaker.

2. The method of claim 1, wherein the one or more pre-determined triggers include one or more words that address a listener.

3. The method of claim 1, wherein focusing on the voice includes cancelling out background noise.

4. The method of claim 1, wherein focusing on the voice includes isolating words from the speaker.

5. The method of claim 1, further comprising:
determining that the voice recognition template exists for the speaker.

6. The method of claim 1, wherein using the voice recognition template and the voice isolation to focus on the voice from the selected speaker is performed in a hearing device.

7. The method of claim 1, wherein Software as a Service (SaaS) is configured to perform method operations.

* * * * *